May 6, 1958  T. P. WHARTON  2,833,146
PLIABILITY TESTER
Filed Sept. 15, 1955  2 Sheets-Sheet 1
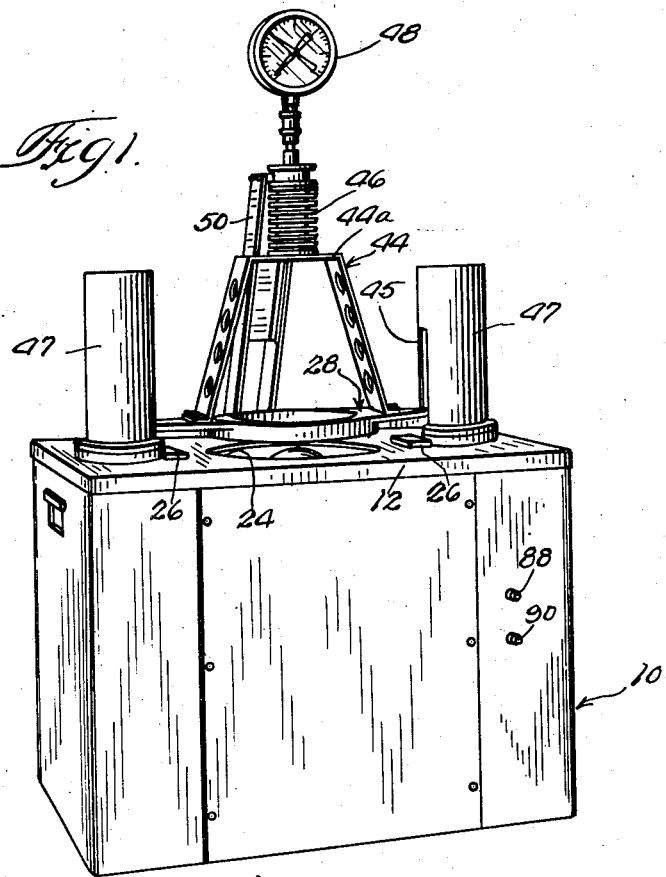
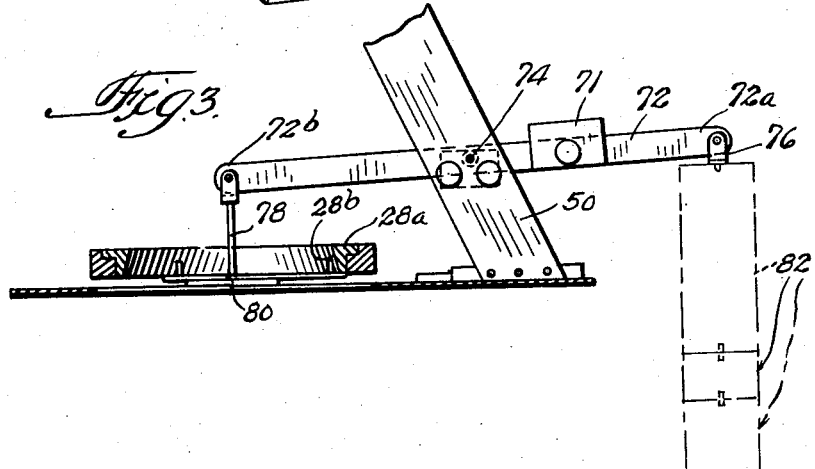
INVENTOR.
Thomas P. Wharton
BY.

May 6, 1958 T. P. WHARTON 2,833,146
PLIABILITY TESTER
Filed Sept. 15, 1955 2 Sheets-Sheet 2

INVENTOR.
Thomas P. Wharton
BY
Thiess, Olson, Mecklenburger,
von Holst & Coltman
ATTYS.

United States Patent Office 2,833,146
Patented May 6, 1958

2,833,146

PLIABILITY TESTER

Thomas P. Wharton, Washington, D. C., assignor to Container Laboratories Inc., Chicago, Ill., a corporation of Illinois Application September 15, 1955, Serial No. 534,567

10 Claims. (Cl. 73—159)

The present invention relates to an improved testing device and, more particularly pertains to a machine adapted to determine the pliability of wrappability of a covering material.

The prior art discloses numerous examples of testing machines designed to ascertain certain data, such as the rigidly, stiffness, bending strength, softness, stretch, elasticity, thickness, smoothness, weight, folding strength, flexibility and/or surface friction of various covering materials. However, nowhere is there disclosed a machine adapted to measure the pliability of papers or other similar covering materials for wrapping about an object.

The pliability of a covering material cannot be ascertained from any of the above-mentioned tests. Pliability is a combination of all of the above properties, each of which affects pliability. For purposes of this invention, pliability may be defined as the ease with which a material can be molded around or conformed to an object being wrapped, or the resistance of a material to a wrapping operation.

It is an object of this invention, therefore, to provide an apparatus designed to simulate actual conditions of wrapping a covering material about an item or package and to measure the resistance to this simulated wrapping opertion, said measurement being a direct indication of the pliability of the covering material.

It is a further object of this invention to provide an apparatus adapted to test the pliability of a large variety of covering materials such as creped papers, waxed sheets, coated papers and laminations of such materials as scrim, plastic, and foil.

It is a still further object of this invention to disclose a testing apparatus which is self-contained, portable, and easy to operate.

The above and other objects will become more apparent from the following description, accompanying drawings and appended claims.

In one embodiment of the invention a cabinet is provided with an apertured top which functions as a support plate for the paper or other covering material whose pliability is to be tested. A counterbalanced, floating ring member is movably mounted above said apertured cabinet top and is concentrically aligned therewith. A hemispherical plunger housed within the cabinet is concentrically aligned with the overlying apertured plate and floating ring member and is driven upwardly through the plate and ring member by a suitable motive means. As the plunger carries the sample of covering material upwardly off of the plate, the ring member forces the covering material to conform substantially to the hemispherical surface of the plunger in a manner simulating the wrapping thereof. The force that the plunger must exert in conforming the covering material to the surface of the plunger is a measure of the effort required to wrap the material. This force is measured by the ring through a bellows assembly, part of which is in comunication with the floating ring and the remainder secured to a pressure gauge carried on the cabinet.

For a more complete understanding of this invention, reference should be made to the drawings, wherein:

Figure 1 is a perspective view of the improved testing apparatus;

Fig. 3 is a fragmentary sectional view of a calibration device for the gauge of the illustrated apparatus.

Figure 2:
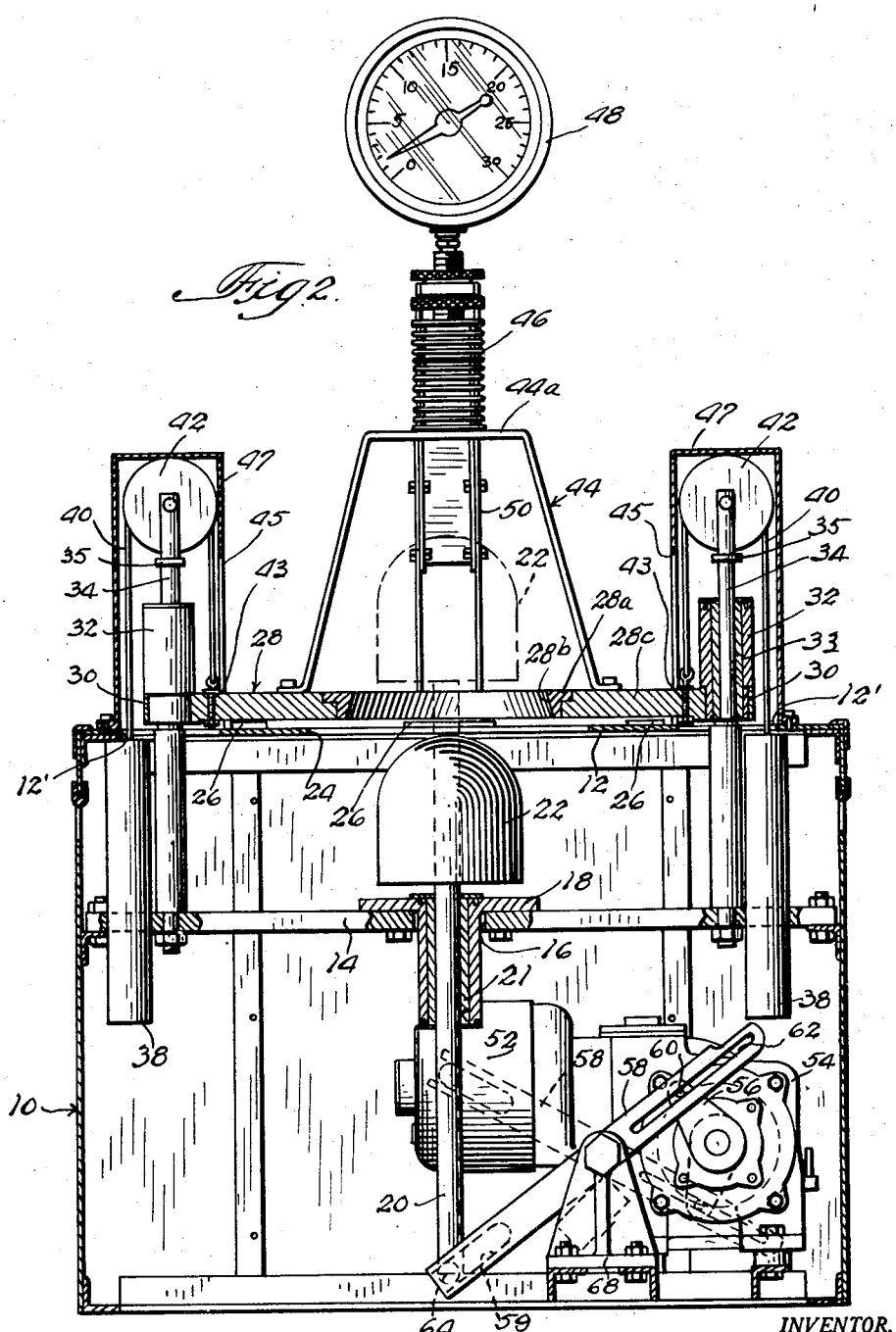
Fig. 2 is an enlarged vertical sectional view partly in elevation of the apparatus of Fig. 1 with the change position of the rod and plunger shown in dotted lines.

Referring now, more particularly, to Figs. 1 and 2, one embodiment of this invention is illustrated comprising a cabinet 10 having mounted thereon by means of bolts or other suitable means an apertured, horizontally disposed cover 12. Housed within the cabinet 10 is a support plate 14, disposed parallel to the cover 12, and in which is formed a center opening 16 through which extends a bearing housing 18 suitably affixed to the support plate 14. A rod 20 having a hemispherical plunger 22 affixed to the upper end slidably engages a bushing 21 positioned within the housing 18. An enlarged aperture 24 formed in the cabinet cover plate 12 is disposed in axial alignment with the rod 20 and hemispherical plunger 22 and is in concentric relation therewith.

The sample of paper or other covering material, the pliability of which is to be tested, is positioned so that it rests on the top or exposed surface of the cabinet cover 12 between three location blocks 26 disposed thereon so that the sample completely conceals the aperture 24. The blocks 26 as seen more clearly in Fig. 1 are spaced apart from the perimeter of the aperture 24.

Mounted above cover 12 is a floating ring assembly 28 which includes an insertable ring 28a having a center opening 28b coaxial with the direction of movement of rod and plunger 22. The ring 28a and associated parts, to be described more fully hereinafter, are mounted for reciprocal movement in a direction coaxial with respect to the direction of movement of rod 20 and plunger 22.

Extending outwardly from ring 28a is a pair of diametrically opposed shoulders 28c, each having a collar 30 formed at the distal end thereof. Positioned within and affixed to each collar 30 is a cylindrically shaped normally disposed bearing housing 32. Each bearing housing 32 has positioned within and affixed to the interior thereof a bushing 33 through which extends the upper portion of a stationary guide rod 34, the latter having the lower end thereof passing through a suitable aperture 12' formed in cover 12 and being secured to the support plate 14 disposed within the cabinet 10. Rotatably secured to the upper end of each guide rod 34 is a pulley 42, which will be discussed more fully hereinafter. Disposed beneath the pulley 42 of each rod is an annular stop flange 35 which is adapted to be contacted by the upper end of housing 32 encompassing the rod, and prevent further upward movement of the attached ring assembly 28 with respect to the rod. Two cylindrical cover members 47 are disposed over the pulley members and are slotted at 45 to allow reciprocal movement of the shoulders 28c.

As has previously been stated, it is the function of the illustrated appartus to determine the wrappability or pliability of a paper or other covering material. The latter materials are to be tested by being forced through ring 28a, the diameter of which is slightly greater than the diameter of the hemispherical plunger 22 and thus will not cause tearing of the sample during testing operations, but yet will enable the sample to readily envelop the plunger 22. The material to be tested is first positioned on the apertured cabinet cover 12 between blocks 26 and beneath the ring 28a. The sample in all instances must have a diameter, or its shortest dimension appreciably larger than the diameter of ring opening 28b.

In the normal course of apparatus operation, the plunger rod 20 moves in an upward axial direction, as will hereinafter be explained in greater detail, forcing the paper or other covering material to be wrapped in all directions simultaneously about the hemispherical plunger 22. Depending upon the pliability of the covering material, the force needed to push the material through the ring opening 28b by means of the plunger 22 will vary. To assure that any force which is expended by the plunger 22 in the forcing of the covering material through the ring opening 28b is only that force necessary to overcome the resistance of the covering material to bending; the floating ring assembly 28 is counterbalanced against gravitational force by weights 38. Each of the weights is suspended within cabinet 10 by a flexible cable 40 which passes over pulley 42. The cable has one end thereof secured to the weight disposed to one side of rod 34 and the other end thereof secured to an anchoring bolt 43 affixed to the shoulder 28c of the ring assembly 28 on the opposite side of the rod. The weights 38 are the same weight as the ring assembly 28 and other attached components, to be more fully discussed hereinafter, and thus any force which may be recorded as a result of the plunger 22 pushing the covering material through the ring opening 28b will be only that force essential to wrap the covering material about the plunger 22, and not a force expended in counteracting the weight of the ring assembly 28 and its attached components as well.

Bolted or otherwise affixed to the diametrically opposed shoulders 28c of the ring assembly 28 is an inverted substantially U-shaped member 44, to be hereinafter referred to as a bellows actuator. Affixed to the bight portion 44a of actuator 44 is the lower end limit of a fluid filled bellows member 46. The upper end of member 46 is connected to a pressure gauge 48 disposed above the actuator 44. Any compression forces exerted on the fluid in the bellows 46 as a result of the upward movement of member 44 are indicated on the gauge 48. The latter gauge is held in a fixed position by a bracket arm 50 extending angularly upwardly from the rear of cabinet 10. It is obvious that other equivalent force indicating means may be substituted for the gauge and bellows assembly.

A motor 52, disposed within cabinet 10 and beneath the tester support plate 14, is provided to effect actutaion of rod 20. The motor 52 is connected directly to a speed reducer 54 which has an exposed crank arm 56 for actuating a rocker arm 58, the latter being connected at its center to a fulcrum bracket 68. Affixed to the end of the crank arm 56 is a pin 60 which is slidably disposed within a longitudinally extending slot 62 formed in one end of arm 58 and to one side of bracket 68. The opposite end of arm 58 is also provided with a longitudinally extending slot 59 which is adapted to slidably accommodate a transversely extending pin 64 formed at the lower end of rod 20.

In the normal course of operation, the motor 52, through the speed reducer 54, turns crank arm 56 in a counterclockwise direction forcing the left-hand portion of the rocker arm 58 to pivotally move in a clockwise direction and move piston rod 20 upwardly. The speed reducer and motor are suitably affixed to the bottom of cabinet 10. Appropriate controls and switches 88 and 90 are provided on the front of cabinet 10 to energize the motor 52. Where the motor 52 is a constant speed motor, the plunger 22 will of course also move at a constant speed.

In Fig. 3 is illustrated a unit for calibrating the gauge 48, which unit comprises an arm 72 which is mounted at 74 for pivotal movement on bracket 50. Positioned on arm 72, intermediate one end 72a thereof and pivot 74, is a slidable weight member 71 which enables calibrator arm 72 to assume a state of balance when a lift fork 76 is secured to end 72a, and a spider 80 and connecting rod 78 are affixed to arm end 72b. Having assumed a state of balance, the ring assembly 28 is then engaged by the spider 80 contacting the underside of ring 28a; given weights 82 are then attached to lift fork 76 of the calibrating unit. Consequently, when a known weight 82 is suspended from fork 76, a corresponding weight should register on gauge 48 mounted atop bracket 50. A complete series of weights may be utilized in the calibration and periodic checking of the gauge 48.

While the ring 28a has heretofore been described as being of circular configuration and plunger 22 as being hemispherical in shape, it is to be understood, of course, that the configuration and shape of these component parts may be readily varied without departing from the scope of this invention. Similar means other than the motive means illustrated may be employed for producing the upward movement of the rod 20. It is obvious that the plane of the floating ring should be exactly perpendicular to the axis of the moving plunger 22, and also be concentric therewith. It is also obvious that to insure accuracy, the floating ring should be properly counterbalanced to enable the gauge 48 to indicate only that force needed to wrap the tested specimen about the hemispherical surface of the plunger. Furthermore, apparatus may be devised wherein the movable ring will force a test sample to be wrapped about a hemispherical plunger having a force recording device in communication therewith. It is intended that such apparatus be within the scope of this invention.

It is thus seen that an apparatus has been provided which functions in an automatic manner and accurately determines the wrappability or pliability of a covering material. It is also apparent that an apparatus for accurately determining the pliability of a plurality of covering materials has been presented which, although of such a size as to be portable, is accurate and composed of relatively few parts.

Many other modifications may be made in details of construction in the illustrated apparatus which will still remain within the ambit of the inventive concept herein disclosed. The invention presented, therefore, is to be limited only by the scope of the appended claims.

I claim:

1. A pliability tester comprising a reciprocally movable plunger affixed to a rod, an axial movable circular ring positioned in a plane perpendicular to the axis of said rod, said circular ring being concentric with the axis of said rod, and having an inner diameter slightly greater than the diameter of said plunger, said circular ring being counterbalanced, stationary means adapted to position materials to be tested between said circular ring and said plunger, and a dynamometer operatively connected to said circular ring responsive to the relative movement thereof.

2. In a pliability tester having a fixedly positioned apertured member adapted to support a sheet of test material whose pliability is to be determined, the combination comprising a power actuated, reciprocally movable element disposed concentrically with respect to said fixedly positioned member aperture and adapted to traverse the same, a unit mounted over said fixedly positioned apertured member and being provided with an opening through which said element passes when moving in the direction of reciprocation, said unit being movable relative to said member in substantially the same direction as said reciprocating element, and stationary means operatively connected and responsive to the movement of said unit for indicating the force required to move said element through the opening of said unit to effect wrapping of such sheet of test material about said element, said unit being counterbalanced whereby the weight thereof is not reflected in the indication of said stationary means.

3. The apparatus as cited in claim 2 in which the power means actuating said element functions at constant speed.

4. A pliability tester comprising a reciprocally movable element, an apertured reciprocally movable unit disposed normal to said element movement, said unit having an aperture thereof slightly larger in size than said element whereby the latter when moving in one relative direction will traverse the aperture of said unit, a stationary apertured member interposed between said element and said unit, and stationary dynamometer indicating means operatively connected to said reciprocally movable unit and responsive to the relative movement thereof.

5. The tester construction as recited in claim 4, in which said stationary dynamometer indicating means is operatively connected to said element, and said unit moves relatively to said element, thereby forcing said element to traverse said unit.

6. A pliability tester comprising a stationary plate having an aperture formed therein over which a test specimen of pliable material is positioned, an axially movable plunger normally disposed to said specimen and said apertured plate and in concentric axial alignment with said aperture, said plunger having a lesser cross-sectional area than said plate aperture, a counterbalanced apertured member movable axially of said plunger and having an opening formed therein of substantially the same configuration as the cross section of said plunger, the opening in said counterbalanced member being concentric with said underlying plate aperture and said plunger, said opening in said counterbalanced member being of slightly greater area than said plunger cross section whereby said plunger may traverse said plate and contact said test specimen positioned thereon forcing the latter through said apertured counterbalanced member, and means indicating the upward force exerted on said counterbalanced member by said plunger.

7. In a pliability tester, a reciprocally movable plunger, stationary means adapted to support a specimen of loose sheet material, the pliability of which is to be tested, a resiliently mounted apertured means having the aperture thereof disposed in a plane normal to said plunger movement; said aperture also being concentric with said plunger, said plunger, when moving in one relative direction, forcing said specimen through said resiliently mounted apertured means, and stationary means for indicating the magnitude of the force exerted by said plunger on said apertured means in forcing such specimen therethrough and in the course of such specimen effecting an enveloping relation with respect to said plunger.

8. In a pliability tester, a reciprocally movable plunger having a hemispherical end, stationary means adapted to support a specimen of loose sheet material, the pliability of which is to be tested, said supporting means being so located as to position the specimen in the path of said plunger reciprocal movement, a resiliently mounted ring disposed above said specimen support and normal to said plunger and concentric with the longitudinal axis thereof, said ring being disposed proximate to said reciprocating plunger whereby it is traversed thereby in the course of said plunger reciprocal movement, said ring defining a lesser cross-sectional area than the test specimen, said supporting means positioning the test specimen between said plunger and said ring to effect wrapping of said specimen about said plunger hemispherical end upon said plunger traversing said ring in one relative direction, and an indicator in communication with and responsive to the resiliency of said ring for indicating the reactive force exerted on said ring by said plunger when the specimen is wrapped about said plunger hemispherical end upon said plunger traversing in one relative direction said ring.

9. A pliability tester comprising a reciprocally movable plunger, an apertured plate for receiving a test sheet disposed normal to the path of said plunger, and having an aperture of such a size as to be traversed thereby, counterbalanced apertured means movably mounted over said apertured plate, the aperture of said counterbalanced means being in registry with the aperture of said plate through which said plunger may move, and a dynamometer operatively connected to said counterbalanced means responsive to the relative movement thereof.

10. A pliability tester comprising apertured means for supporting a sheet, the pliability of which is to be tested, means for traversing said apertured means and removing said test sheet therefrom, means disposed in the path of said sheet-removing means after said apertured means is traversed, said latter means having an opening through which said sheet-removing means may force said test sheet, and means operatively connected to said means disposed in the path of said sheet-removing means for measuring the force required to move said test sheet through said means disposed in the path of said sheet-removing means.

References Cited in the file of this patent

UNITED STATES PATENTS

| | | |
|---|---|---|
| 1,385,164 | Witham | July 19, 1921 |
| 1,709,638 | Thwing | Apr. 16, 1929 |
| 1,878,193 | Scott | Sept. 20, 1932 |
| 2,714,328 | Hamburger | Aug. 2, 1955 |
| 2,786,352 | Sobota | Mar. 26, 1957 |

FOREIGN PATENTS

| | | |
|---|---|---|
| 458,192 | Great Britain | Dec. 15, 1936 |